(12) United States Patent
Schuellein

(10) Patent No.: US 7,492,136 B2
(45) Date of Patent: Feb. 17, 2009

(54) MULTI-PHASE CONVERTER WITH IMPROVED LOAD STEP-UP TRANSIENT RESPONSE

(75) Inventor: George Schuellein, Narrangansett, RI (US)

(73) Assignee: International Rectifier Corporation, El Segundo, CA (US)

(*) Notice: Subject to any disclaimer, the term of this patent is extended or adjusted under 35 U.S.C. 154(b) by 240 days.

(21) Appl. No.: 11/530,957

(22) Filed: Sep. 12, 2006

(65) Prior Publication Data

US 2007/0064456 A1 Mar. 22, 2007

Related U.S. Application Data

(60) Provisional application No. 60/717,841, filed on Sep. 16, 2005.

(51) Int. Cl.
G05F 1/59 (2006.01)
(52) U.S. Cl. .................... 323/272; 323/283; 363/65
(58) Field of Classification Search ............... 323/222, 323/282–289, 269, 273; 363/89, 97, 131, 363/21.15; 307/65, 66
See application file for complete search history.

(56) References Cited

U.S. PATENT DOCUMENTS 6,696,825 B2  2/2004  Harris et al.
7,368,898 B2 *  5/2008  Sutardja et al. ............. 323/285
2006/0012352 A1  1/2006  Moussaoui et al.

\* cited by examiner

*Primary Examiner*—Rajnikant B Patel
(74) *Attorney, Agent, or Firm*—Ostrolenk, Faber, Gerb & Soffen, LLP

(57) ABSTRACT

A multi-phase converter comprising a plurality of switching circuits each providing a switched voltage to an output node of the converter and wherein each switching circuit sequentially provides a switched output voltage to the output node at which an output voltage of the converter is developed; a clock circuit for providing a plurality of out of phase clock signals to the switching circuits to determine when each switching circuit provides the switched voltage to the output node; each switching circuit comprising first and second series connected switches connected across a DC voltage bus; further comprising a first circuit comparing a first signal proportional to a difference between the output voltage of the converter at the output node and a first reference voltage with a second signal comprising a ramp signal and for producing a pulse width modulated signal to control the on-times of the switches of the connected switching circuit; further comprising a second circuit comparing the first signal proportional to the difference between the output voltage and the first reference voltage to a second reference voltage and if the first signal exceeds the second reference voltage by a prescribed amount, for turning on at least one switching circuit to provide the switched output voltage to the output node prior to occurrence of the clock signal.

10 Claims, 14 Drawing Sheets

| FIG. 1A | FIG. 1B | FIG. 1C |
|---|---|---|
| | FIG. 1D | |
| | FIG. 1E | |

| FIG.2A | FIG.2B |
| FIG.2C | |

…

MULTI-PHASE CONVERTER WITH IMPROVED LOAD STEP-UP TRANSIENT RESPONSE

CROSS-REFERENCE TO RELATED APPLICATIONS

This application claims the benefit and priority of U.S. Provisional Application Ser. No. 60/717,841 filed Sep. 16, 2005 entitled IR3550/3505 CHIP, the entire contents of which are incorporated by reference herein.

BACKGROUND OF THE INVENTION

The present invention relates to DC to DC converters, and in particular, to multi-phase converters which produce a DC output voltage at the common output of a plurality of coupled switching power supplies, for example, a plurality of buck converters.

Multi-phase converters are known. In a typical multi-phase converter, for example, a multi-phase buck converter, a plurality of buck converters are provided each having their output inductors coupled to the output node. In a typical application, each buck converter is controlled by a control circuit and may be operated such that a control switch of each buck converter switching stage is turned on at a different time than the other phases. In this way, each phase sequentially provides power to the load, reducing ripple and reducing the size of the output capacitance.

FIG. 1 shows an example of a six-phase multi-phase converter which employs the IR3500 control integrated circuit 10 and a plurality, in the six-phase case shown, six IR3505 phase ICs 30 which are controlled by the control IC. Each phase IC 30 is identical and has outputs connected to a respective buck converter comprising two switches, an upper switch Q1 functioning as the control switch and the lower switch Q2 functioning as a synchronous switch. The switch node $V_s$ 1-6 of each respective phase is connected to an output inductor L1 through L6 for each of the phases which are connected at a common node VC and coupled to an output node VOUT through any distribution impedance present. An output capacitor COUT is coupled across the output to filter the switched output voltage.

In the typical multi-phase converter, each control switch Q1 is turned on to provide output current to charge the output inductor to provide current to the load at a time determined by a clock pulse which may be provided by the control IC. Thus, the control switch will turn on only when a clock pulse has occurred. The clock pulses for each phase IC (labeled PHSIN) are shown in FIG. 3. As shown, the PHSIN signals (IC1 PHSIN, IC2 PHSIN, IC3 PHSIN, IC4 PHSIN are each delayed to turn on the respective phase control switches Q1 out of phase from each other. The turn-on of the synchronous switches Q2 are likewise delayed, but turn on in complementary manner to the control switches.

With reference to FIG. 2 which shows in greater detail the circuit of FIG. 1, although showing only two phase ICs 30, the clock pulse is provided at CLKOUT from the control IC 10. As shown in FIG. 4, at A, and with reference to FIG. 2, when a clock pulse occurs, this starts a ramp signal PWMRMP which is shown at the non-inverting input of the PWM comparator 45 in FIG. 2. It also turns on the control switch Q1. See C of FIG. 4. PWMRMP is shown in waveform B of FIG. 4. The base level for the PWM ramp is a signal VDAC[1] which is provided by the control IC 10 based on a reference voltage level set by VID signals VID0 for VID7. See FIG. 1. When PWMRMP equals the output of an error amplifier 20 in the control chip 10, which compares feedback FB from the output voltage of the converter against the reference voltage VDAC, as shown in FIG. 2, the control or high side switch Q1 is turned off and the low or synchronous switch Q2 is turned on. See waveforms C and D of FIG. 4. As shown, the control or high side switch Q1 is turned on when the clock pulse occurs and turned off when the ramp voltage equals the error amplifier output. This is shown for a range of error amplifier signals in FIG. 4B. As shown, when the error amplifier output increases due to a load step-up as shown at I in FIG. 4B, the control switch Q1 is only turned on when the clock pulse occurs and is turned off when the PWM ramp voltage has reached the error amplifier output EAIN. A shown in FIG. 4, the increased error amplifier output results in increased Q1 duty cycle. The duty cycle accordingly follows the error amplifier signal and once the error amplifier decreases due to for example, a load decrease, the duty cycle is reduced, as shown in FIG. 4C.

Accordingly, as can be understood from the above, the control switch is only turned on when the clock pulse occurs. Thus there is a delay time until the clock pulse occurs before the converter can respond to the load transient. Thus, for example, if a load transient occurs in advance of the clock pulse as shown by the dotted line at I in FIG. 4B, the converter cannot respond by turning on the control switch until the clock pulse occurs.

This is exacerbated by a situation where a large load transient occurs and the turn-on of the next-phase control switch Q1 may be inadequate to address the current requirements caused by the load transient.

Accordingly, it would be desirable to be able to provide a multi-phase converter which is capable of an immediate response to a load transient and which does not need to wait until the clock pulse occurs in order to turn on at least one of the converter control switches, and preferably all the phase control switches.

SUMMARY OF THE INVENTION

Accordingly, it is an object of the present invention to provide a multi-phase converter which provides a rapid response to an increased load transient.

According to the invention, a multi-phase converter is provided in which at least one and preferably all control switches of the multi-phase converter are turned on immediately upon the occurrence of an increased load transient without waiting for a system clock pulse to occur.

In accordance with the invention, a multi-phase converter is provided comprising a plurality of switching circuits each providing a switched voltage to an output node of the converter and wherein each switching circuit sequentially provides a switched output voltage to the output node at which an output voltage of the converter is developed; a clock circuit for providing a plurality of out of phase clock signals to the switching circuits to determine when each switching circuit provides the switched voltage to the output node; each switching circuit comprising first and second series connected switches connected across a DC voltage bus; further comprising a first circuit comparing a first signal proportional to a difference between the output voltage of the converter at the output node and a first reference voltage with a second signal comprising a ramp signal and for producing a pulse width modulated signal to control the on-times of the switches of the connected switching circuit; further comprising a second circuit comparing the first signal proportional to the difference between the output voltage and the first reference voltage to a second reference voltage and if the first signal exceeds the second reference voltage by a prescribed amount, for turning on at least one switching circuit to provide the switched output voltage to the output node prior to occurrence of the clock signal.

Other objects, features and advantages of the invention will be apparent from the detailed description which follows.

BRIEF DESCRIPTION OF THE DRAWING(S)

The invention will now be described in greater detail in the following detailed description with reference to the drawings in which.

DETAILED DESCRIPTION OF PREFERRED EMBODIMENTS OF THE INVENTION

Figure 1A:
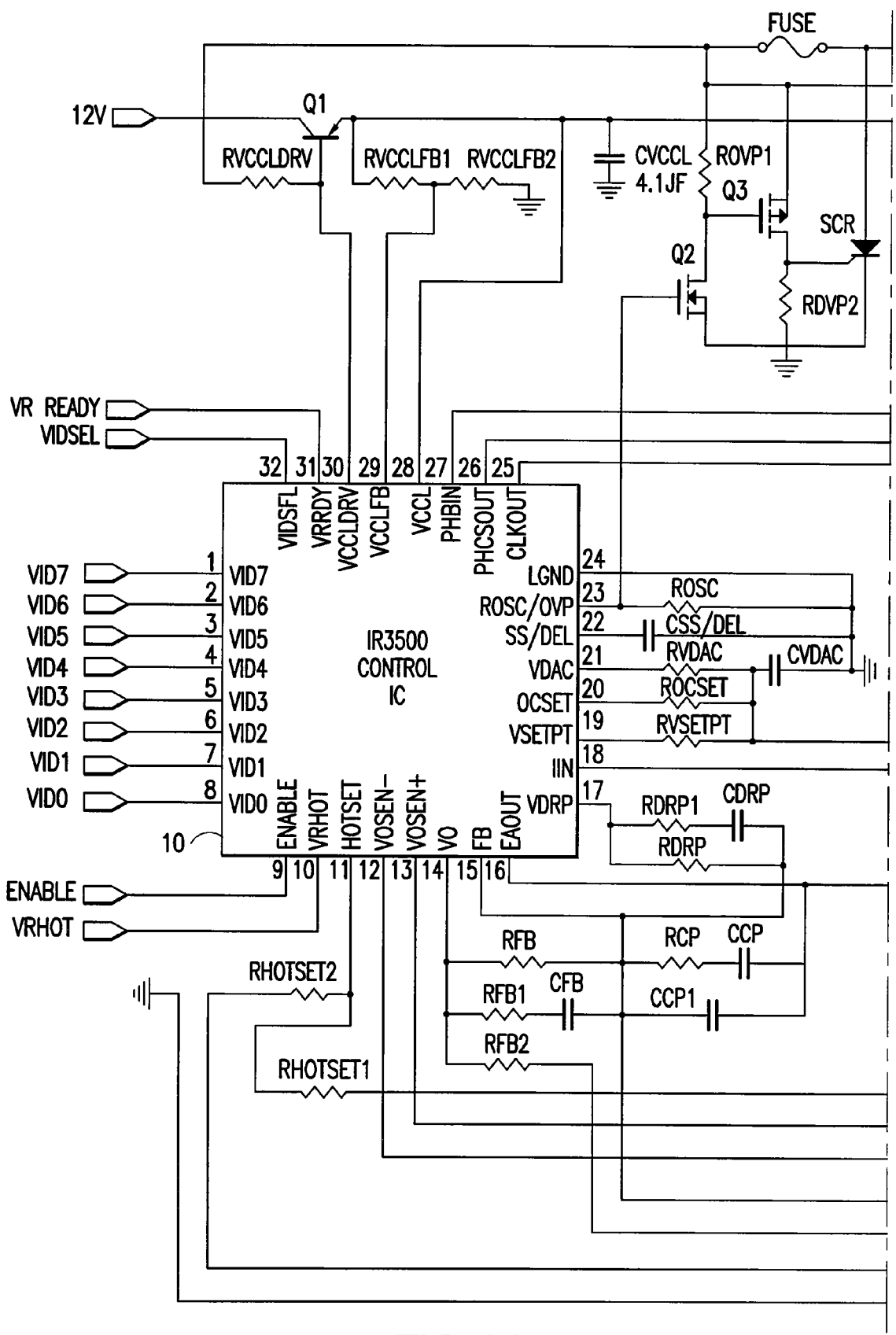
FIG. 1 shows a six-phase multi-phase converter to which the invention can be applied.
Figure 1B:
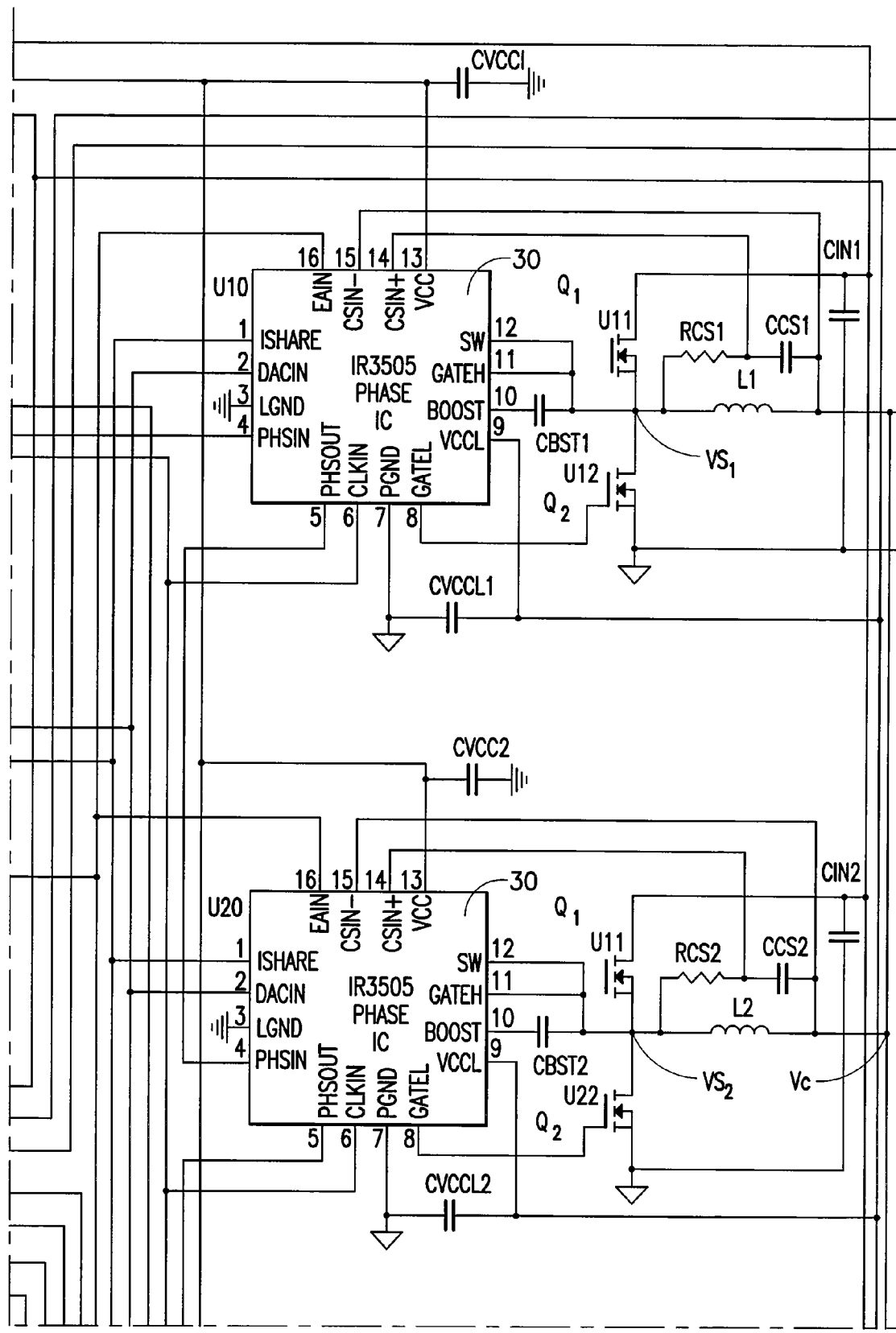
Figures 1, 1C:
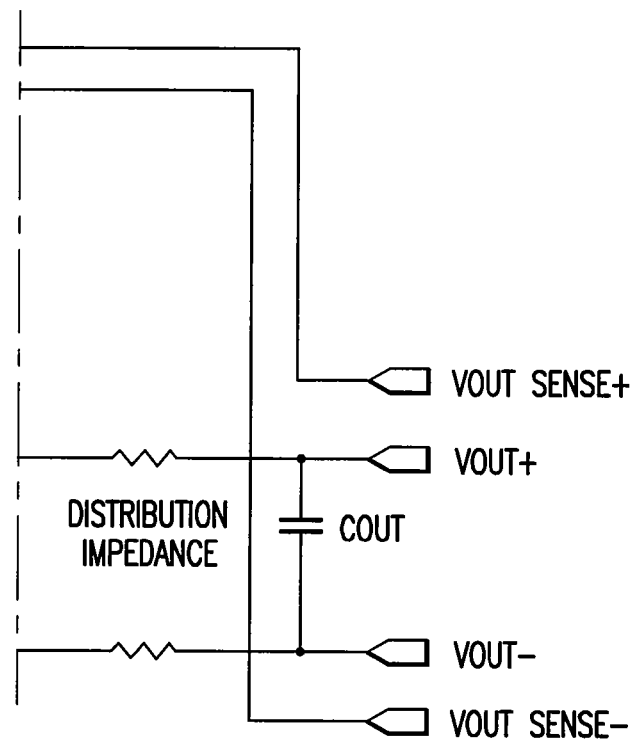
Figure 1D:
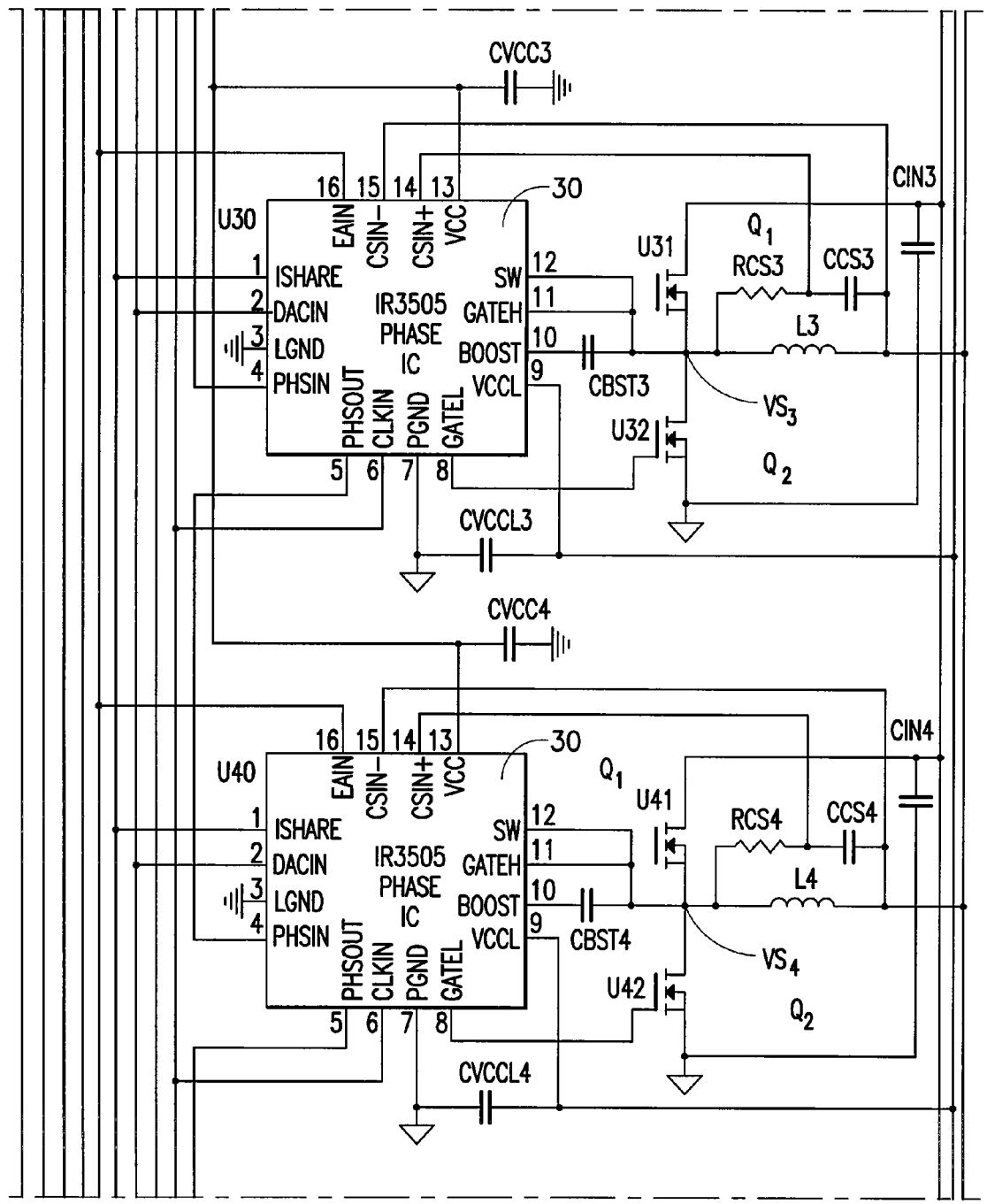
Figure 1E:
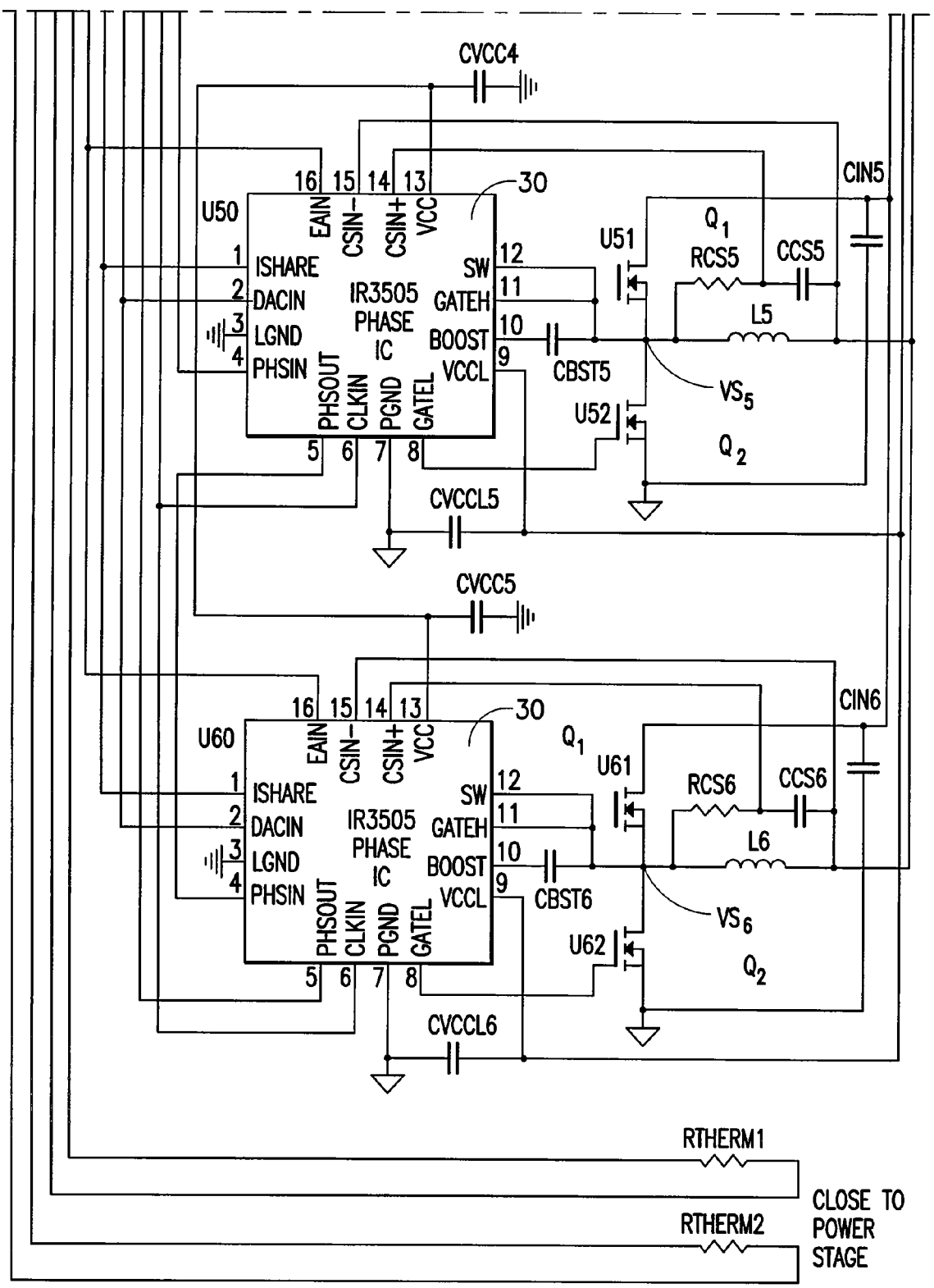
Figures 2, 2A:
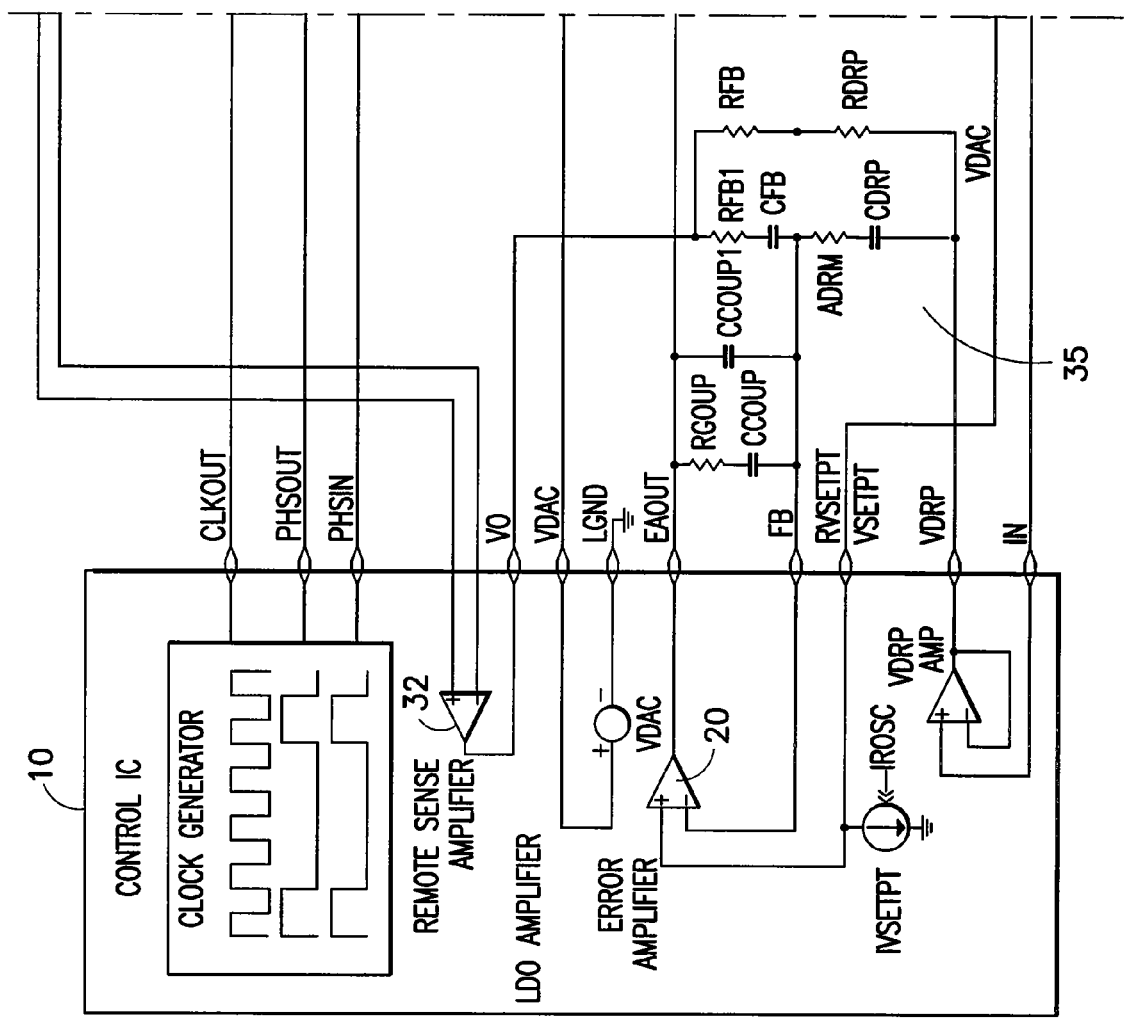
FIG. 2 shows in greater detail the multi-phase converter of FIG. 1 showing only two phases in detail.
Figure 2B:
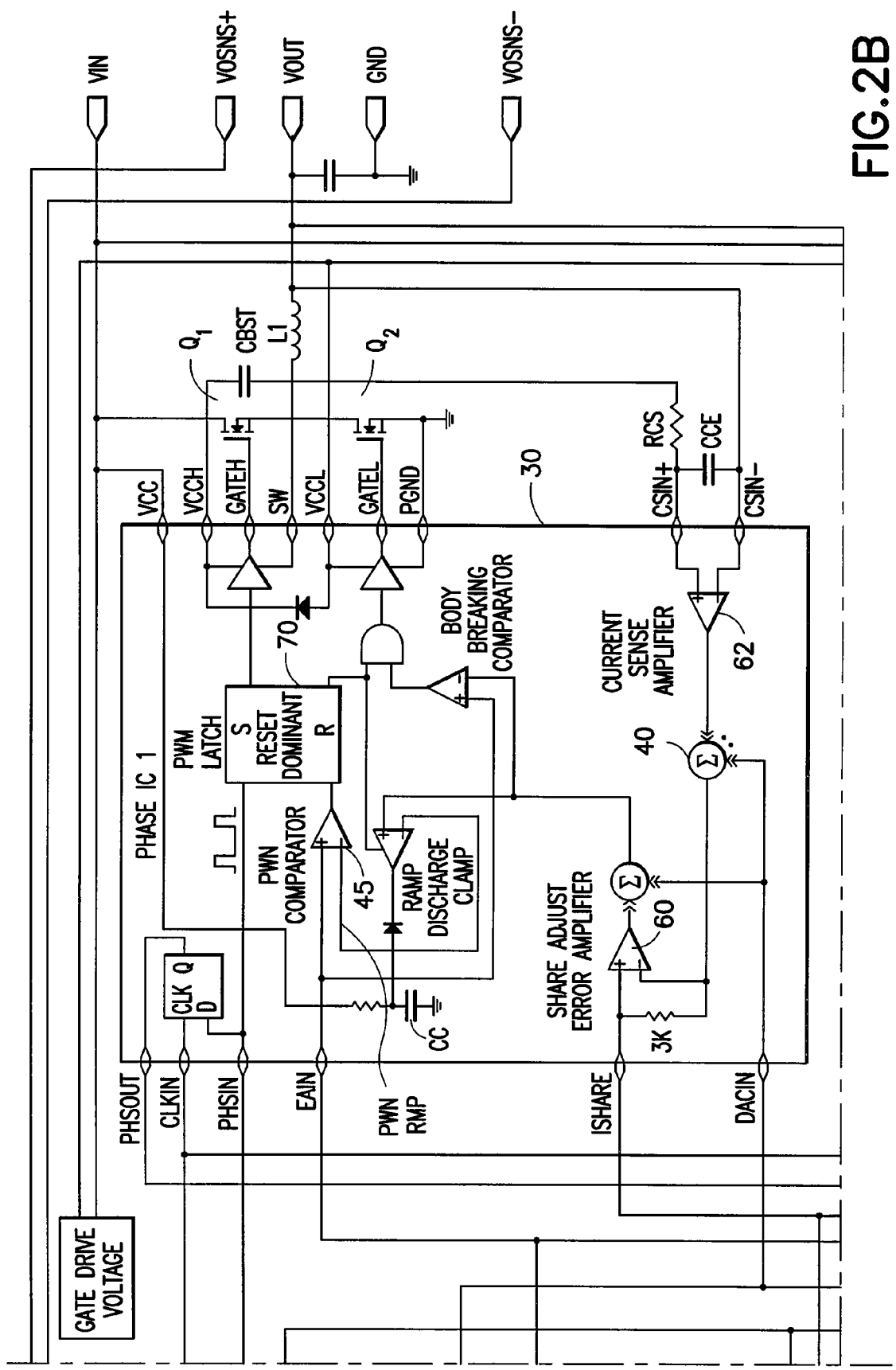
Figure 2C:
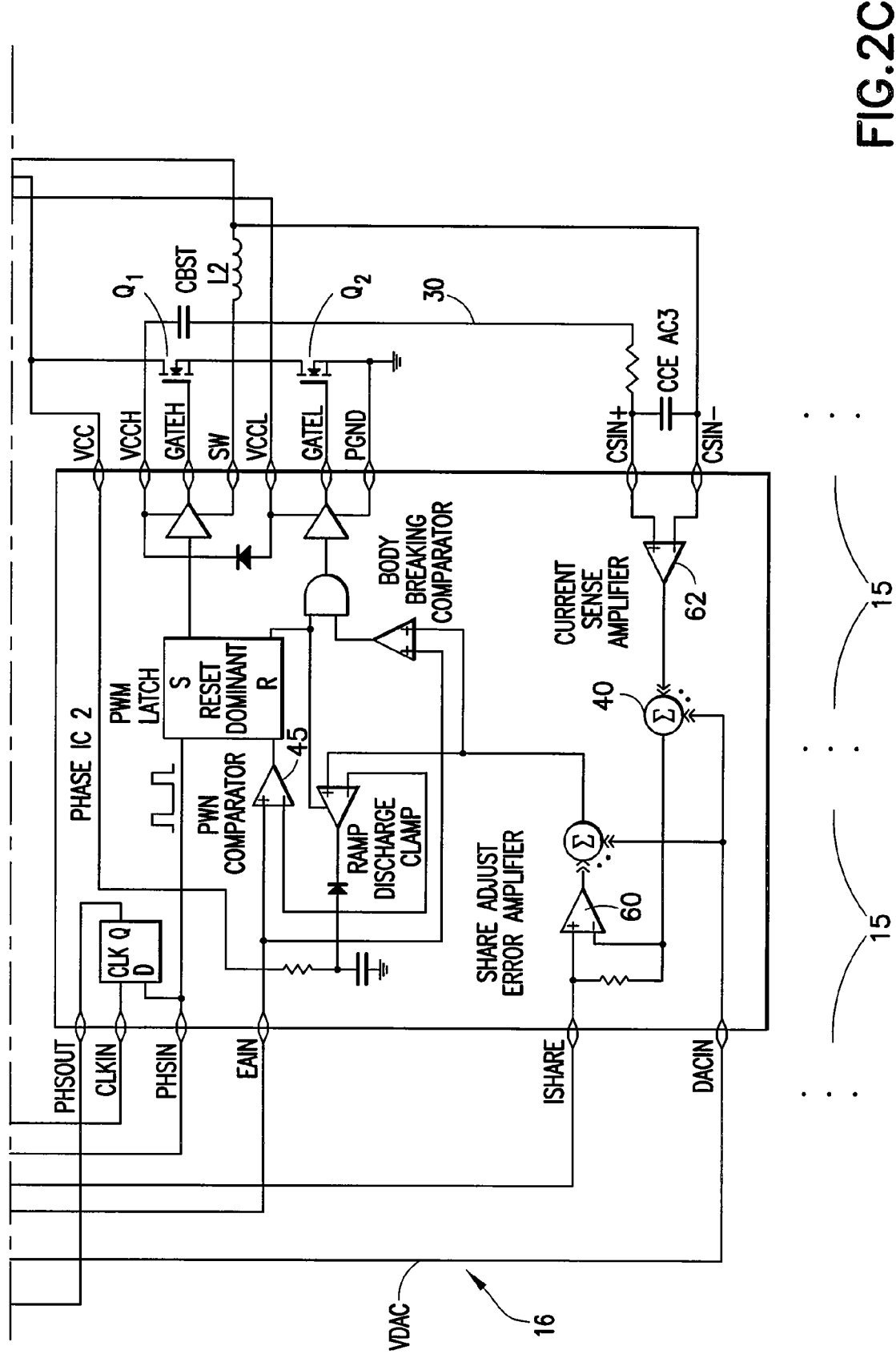

With reference again to the drawings, FIGS. 1 and 2 show a multi-phase converter to which the invention is applicable. FIG. 2 shows greater details of the circuit of FIG. 1 only showing two phase ICs 30 in detail, which are identical. Each phase IC 30 controls a buck converter comprising two transistors Q1 and Q2 and an output inductor $L_N$. Transistor Q1 is the control switch and transistor Q2 is the synchronous switch. The synchronous switch can be replaced by a diode, as well known to those of skill in the art, although the use of a synchronous switch provides greater efficiency.

Although FIGS. 1 and 2 show a separate control integrated circuit 10 and phase integrated circuits 30, the circuit can use a single integrated circuit or discrete circuitry or any number of ICs, e.g., all phases in one IC, for example.

Figure 3:
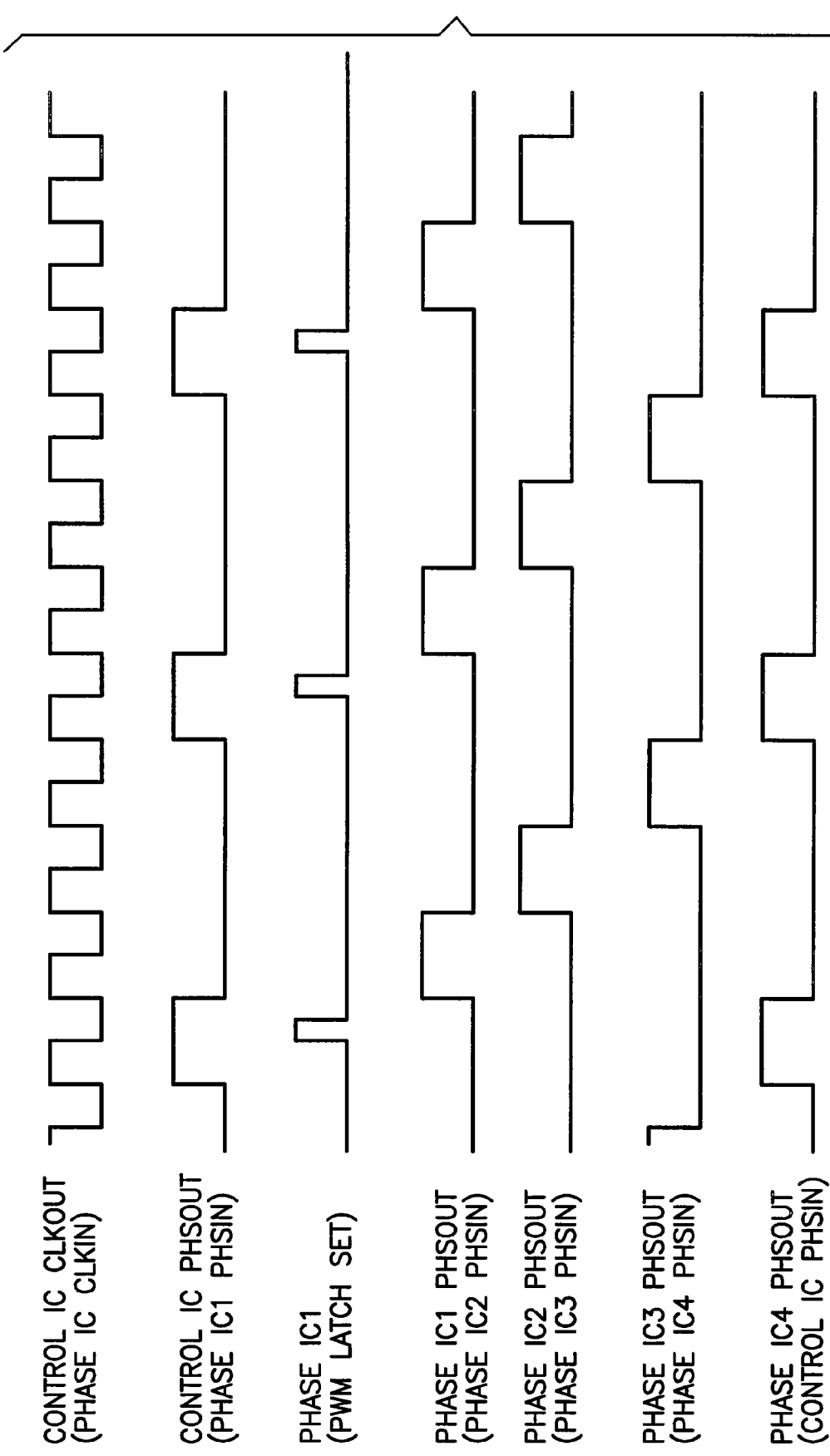
FIG. 3 shows waveforms in FIG. 2 for four phases.

As shown in FIG. 2, the control IC 10 provides a clock signal CLKOUT, as shown in FIG. 3, to each of the phase ICs at the input CLKIN. Dotted lines 15 in FIG. 2 show that additional phases or phase ICs can be employed depending upon the load requirements in which case the signal lines 16 would extend to the additional phase ICs.

As shown in FIGS. 2 and 3, clock signal CLKIN is provided to each phase IC 30. In addition, a reduced frequency signal PSHIN is provided to the first phase IC which is the clock signal which sets the PWM frequency of the phase IC. The first phase IC provides a signal PHSOUT which is provided to the input of the next phase IC to provide a delayed clock signal PHSIN to that phase IC. This is shown in greater detail in FIG. 1 for a six-phase converter. FIG. 3 shows how sequentially out of phase clock signals PHSIN are provided to each of the phase ICs to control the respective on times of the control and synchronous switches of each of the respective buck converters. FIG. 3 shows the sequentially delayed clock signals PHSIN for each of four phase ICs, phase IC1 through phase IC4. As can be seen in FIG. 3, each of the clock signals PHSIN for each phase IC is delayed sequentially to provide the out of phase timing control for turning on the respective switches Q1 and Q2 of each phase.

Figure 4:
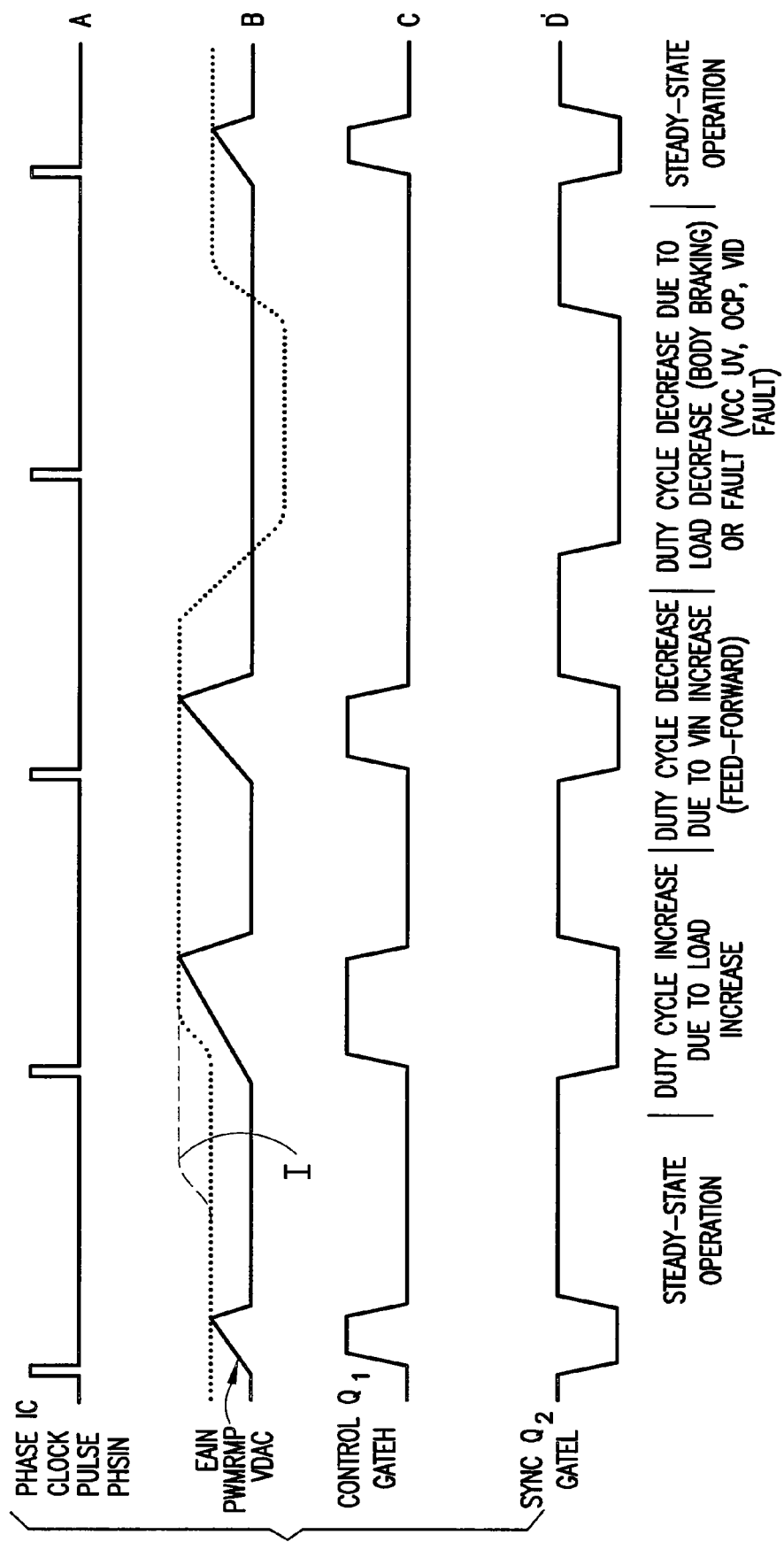
FIG. 4 shows waveforms in FIG. 2.

FIG. 4, as already described, shows the phase IC clock pulse PHSIN for a single phase and exemplary PWM ramp and error amplifier EAIN signals and the gate output signals for the control and synchronous (SYNC) switches.

As described above, a problem occurs in that if a stepped-up load transient occurs prior to the clock pulse (see I in FIG. 4B), the converter must wait until the clock pulse before responding to the transient. This delay can cause the voltage at the output to decrease undesirably.

According to the invention, to address this problem, a circuit is employed which determines if the error amplifier voltage is above a reference voltage by a prescribed amount. If the error amplifier output voltage exceeds the reference voltage by the prescribed amount, the gate signal for the control switch is turned on immediately and the gate signal for the synchronous switch is turned off. This can be done for a single phase or, preferably, the control switches for all phases are turned on at the same time thus providing an immediate burst of power to satisfy the load requirements.

Figure 5:
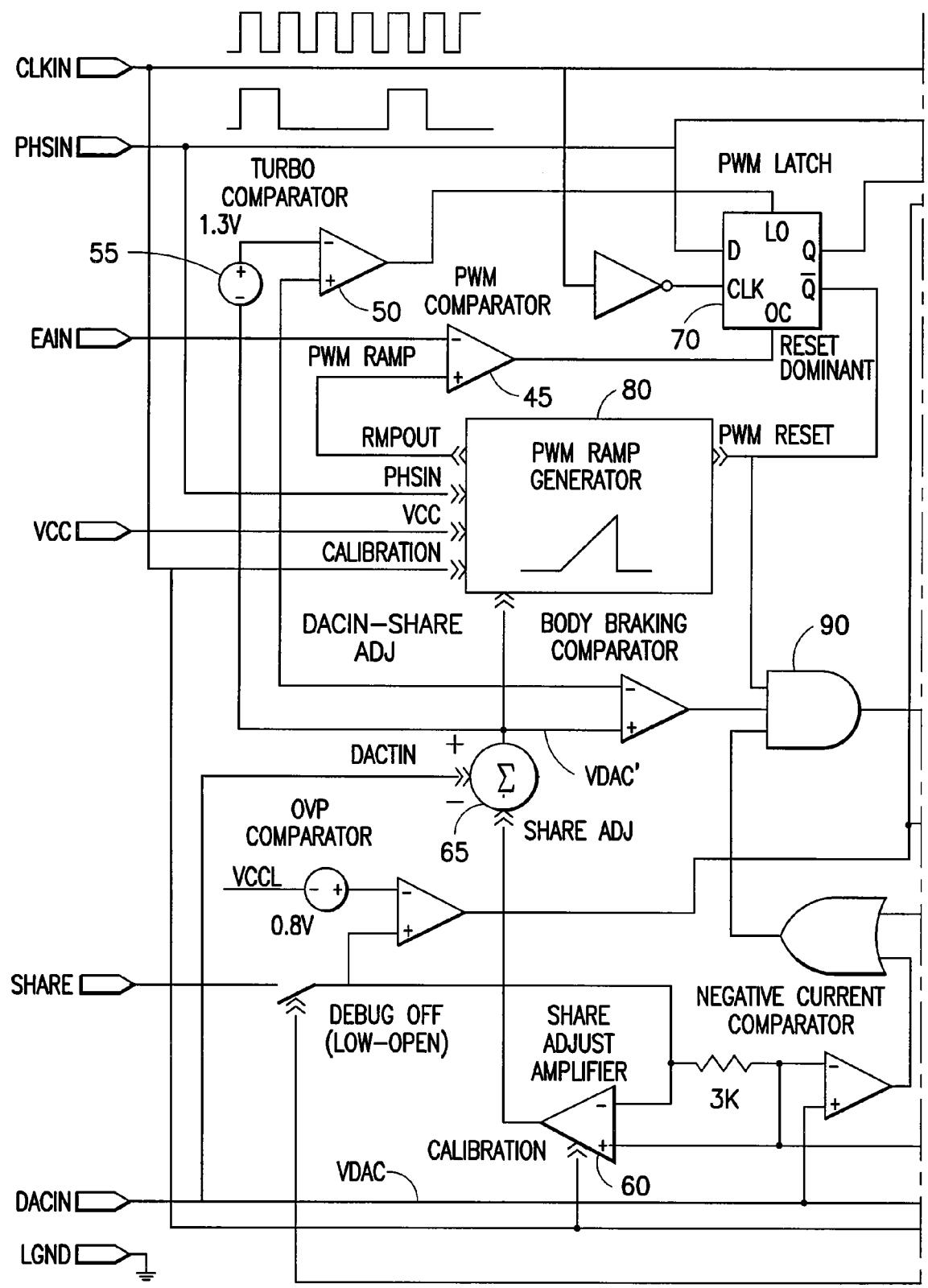
FIG. 5 shows a detailed block diagram of one phase control circuit for controlling a buck converter output stage illustrating one embodiment of the invention.
Figure 5B:
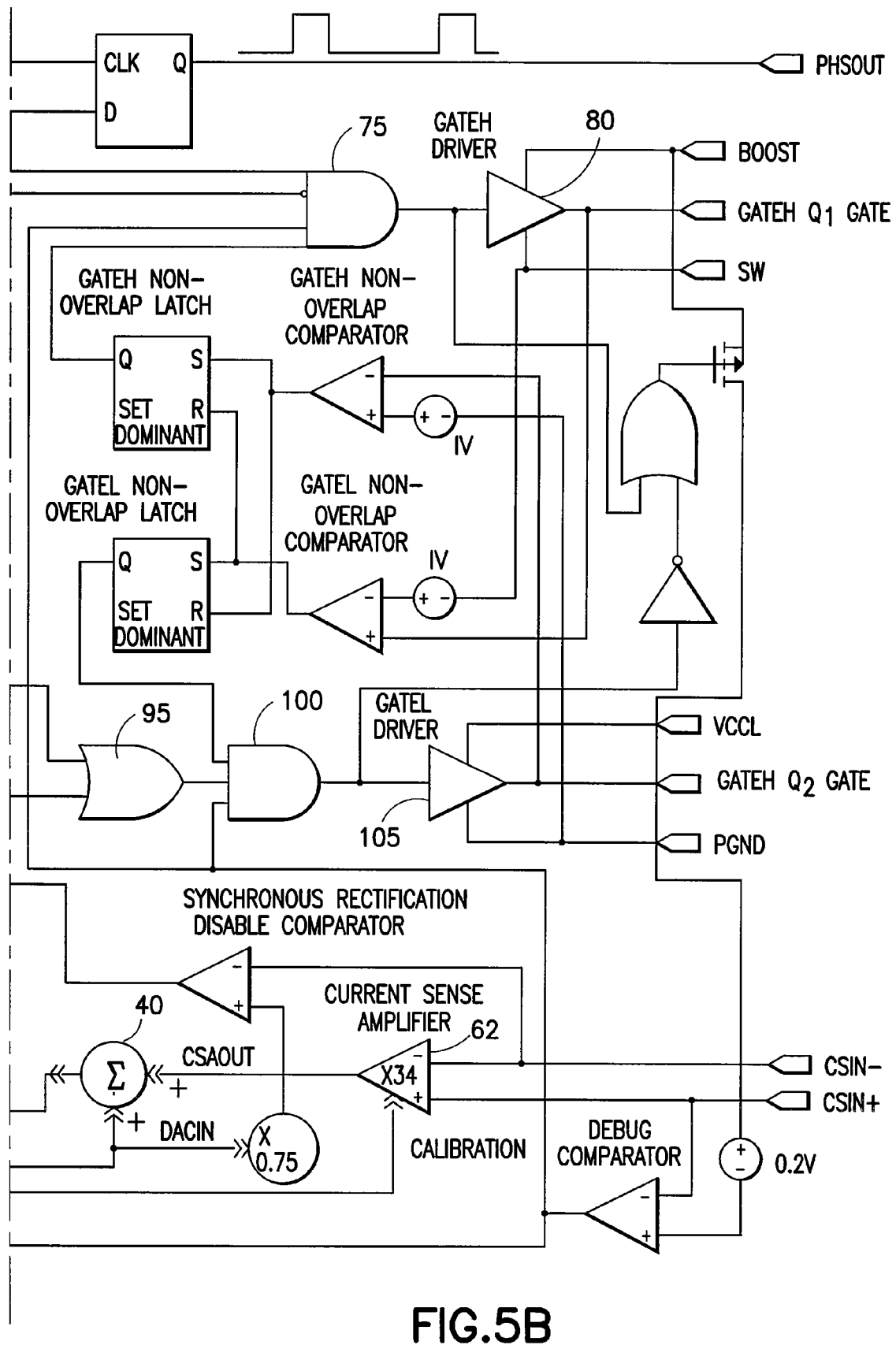
Figure 6:
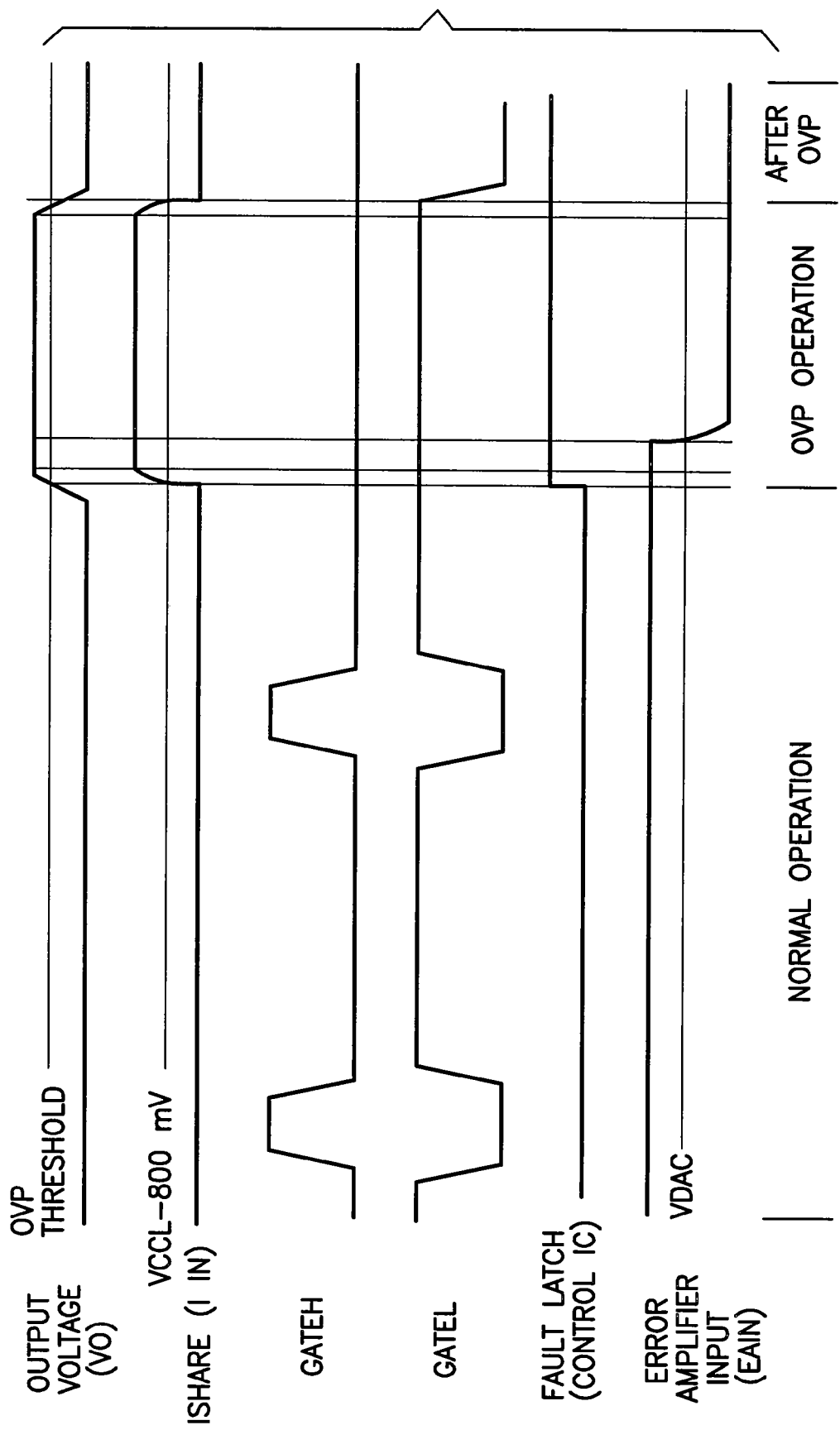
FIG. 6 shows waveforms of the circuit of FIG. 5.

With reference to FIGS. 2, 5 and 6, in normal operation, the output voltage VOUT is monitored by an error amplifier 20. See FIG. 2. The error amplifier 20, shown in the control IC 10, receives a signal FB from the remote sense amplifier 32 which senses the output voltage across terminals VOSENSE+ and VOSENSE− and produce an output $V_O$. This output $V_O$ (FIG. 2) is provided through a voltage divider circuit 35 to the inverting input of the error amplifier 20. The non-inverting input of the error amplifier 20 is provided with a signal VDAC provided at the input VSETPT. This sets the desired converter output voltage. VDAC is itself the output of a digital to analog converter in control chip 10 which receives digital inputs VID0 to VID7 from a microprocessor to set the output voltage. The output of the error amplifier EAOUT represents the deviation of the output voltage from the reference VDAC. This error amplifier signal, shown as EAIN at the input of the phase ICs 30, is compared in each phase IC by a PWM comparator 45 to a ramp voltage PWM RMP which begins as shown in FIG. 4 when the clock pulse PHSIN occurs. When the clock pulse occurs, the PWM latch 70 is set turning on the control switch Q1. The synchronous switch Q2 is turned off slightly before the control switch Q1 is turned on to avoid shoot-through. Once the ramp voltage equals the error amplifier voltage, the PWM comparator 45 output resets the PWM latch 70, turning off the control switch Q1 and turning on the synchronous switch Q2 after a small time delay, again to prevent shoot-through.

FIG. 6 shows the operation of the circuit of FIG. 5 which shows greater details of the circuit of FIG. 2. There is also a current sense amplifier 62 in each phase IC 30 which monitors the current in the output inductor for that phase. The output of the current sense amplifier 62 is summed with the voltage VDAC (DAC IN) in a summing stage 40 and compared to an average current signal ISHARE in a share adjust error amplifier 60. The output of the share adjust error amplifier 60 adjusts the charge rate of a charging capacitor Cc to adjust that phases' share of the total output current. For example, if the current sensed in the particular phase is higher than the average (ISHARE), the PWM ramp generator 80 will adjust the PWM ramp to reduce the current in that phase to bring it closer to the average. This is done in each of the phase ICs so that each phase shares equally in the total current supply to the load.

As shown in FIG. 6, a response of the circuit to an overvoltage in the output voltage (over voltage protection—OVP) is shown whereby when the output voltage exceeds the OVP threshold, a fault latch in the control IC is operated causing the control switch Q1 not to be turned on for the next clock pulse resulting in the error amplifier output EAIN to the phase ICs reducing to reduce the output voltage.

Figure 7:
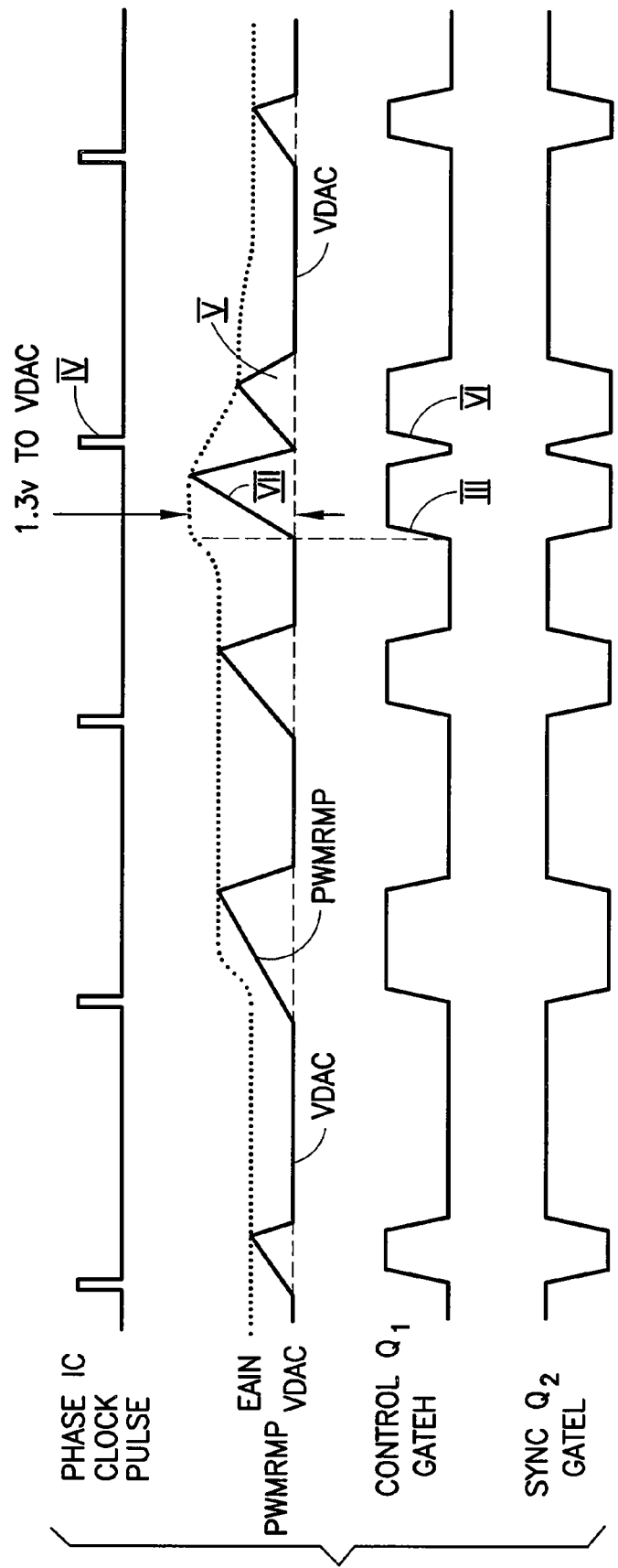
FIG. 7 shows how the circuit responds to a stepped-up load transient.

FIG. 7 shows the response of the circuit to a stepped-up load transient. When a stepped-up load transient occurs, the error amplifier output voltage will increase because the converter output voltage will decrease. If the output voltage EAIN of the error amplifier 20 exceeds a prescribed amount, as shown in FIG. 7, illustratively 1.3 volts above a reference voltage VDAC$^1$, a comparator 50 (having a reference 55 voltage of illustratively 1.3 volts above the voltage VDAC$^1$, which is in turn set by the share adjust amplifier 60, via a summing stage 65) output goes high setting the PWM latch 70. Note that VDAC$^1$ is a modified form of VDAC, as it is adjusted by the output of the share adjust amplifier 60. If the share adjust amplifier 60 is not present then VDAC and VDAC$^1$ are the same. The setting of PWM latch 70 forces the output gate H, which is the gate of the control switch Q1, high via gate 75 and the driver 80. Slightly before this time, the complementary output of the PWM latch 70 resets the PWM ramp generator 80 and via gates 90, 95, 100 and the gate driver 105, turns off the synchronous switch Q2.

This is shown in FIG. 7 where the gate signal to the control switch (gate H) is turned on at III prior to the clock signal pulse at IV. As shown in FIG. 7, once the clock signal occurs, the PWM ramp begins again, as shown at V, turning on the control switch as shown at VI.

In accordance with the invention, in order to prevent the high side switch Q1 from conducting too long, the PWM ramp slope is increased, e.g., doubled, during this mode of operation. This is shown by the increased slope at VII in FIG. 7. The phase IC 30 comes out of this mode once the PWM ramp signal rises above the error amplifier output.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A multi-phase converter comprising:
a plurality of switching circuits each providing a switched voltage to an output node of the converter and wherein each switching circuit sequentially provides a switched output voltage to the output node at which an output voltage of the converter is developed;
a clock circuit for providing a plurality of out of phase clock signals to the switching circuits to determine when each switching circuit provides the switched voltage to the output node; each switching circuit comprising first and second series connected switches connected across a DC voltage bus; further comprising a first circuit comparing a first signal proportional to a difference between the output voltage of the converter at the output node and a first reference voltage with a second signal comprising a ramp signal and for producing a pulse width modulated signal to control the on-times of the switches of the connected switching circuit;
further comprising a second circuit comparing the first signal proportional to the difference between the output voltage and the first reference voltage to a second reference voltage and if the first signal exceeds the second reference voltage by a prescribed amount, for turning on at least one switching circuit to provide the switched output voltage to the output node prior to occurrence of the clock signal.

2. The multi-phase converter of claim 1 wherein each switching circuit comprises a control switch and a synchronous switch coupled in series with a switched node at a common connection point between the two switches and wherein the control switch of at least one of the switching circuits is turned on in response to the error amplifier output voltage exceeding the second reference voltage by the prescribed amount.

3. The multi-phase converter of claim 2 wherein the control switches of at least two switching circuits are turned on in response to the error amplifier output voltage exceeding the second reference voltage by the prescribed amount.

4. The multi-phase converter of claim 3 wherein the control switch of each of the switching circuits are turned on in response to the error amplifier output voltage exceeding the second reference voltage by the prescribed amount.

5. The multi-phase converter of claim 1 wherein the second circuit comprises a comparator circuit.

6. The multi-phase converter of claim 1 wherein the second reference voltage is adjusted by the output of a current sharing circuit that adjusts the first reference voltage to produce the second reference voltage in response to an output current provided by the switching circuit to equalize the output currents provided by the switching circuits.

7. The multi-phase converter of claim 1, wherein the ramp signal has a first slope, and wherein the slope is increased when the first signal exceeds the second reference voltage by the prescribed amount.

8. The multi-phase converter of claim 7, wherein the increased slope is twice the first slope.

9. The multi-phase converter of claim 1, wherein the first and second reference voltages are the same.

10. The multi-phase converter of claim 2, wherein each switching circuit comprises a buck converter having an output inductor coupling the switched node to the converter output node.

* * * * *